UNITED STATES PATENT OFFICE.

JOHN URI LLOYD, OF CINCINNATI, OHIO.

ALKALOIDAL COMPOUND.

1,250,331.     Specification of Letters Patent.     Patented Dec. 18, 1917.

No Drawing.     Application filed July 6, 1915. Serial No. 38,317.

*To all whom it may concern:*

Be it known that I, JOHN URI LLOYD, a citizen of the United States of America, and resident of Cincinnati, county of Hamilton, State of Ohio, have invented certain new and useful Improvements in Alkaloidal Compounds, of which the following is a specification.

The object of my invention is a means of extending the medicinal uses of alkaloidal substances.

I have discovered that certain insoluble clays or compounds of magnesium, when mixed with certain alkaloids or alkaloidal salts, will adsorb them and prevent their going into solution in water or liquids which are acidulated even to a slight degree, but that in liquids which are alkaline even to a slight degree, such alkaloidal substances will go into solution.

The contents of the stomach are usually slightly acid, whereas the intestines are slightly alkaline. Hence the alkaloidal compounds of my invention will pass through the stomach, without the alkaloids or alkaloidal salts being dissolved, and in the intestines the alkaloids or alkaloidal salts will be dissociated.

The preferred form of magnesium compound is hydrous magnesium silicate, or a form of aluminium silicate containing magnesium.

The phenomena aforedescribed takes place when these compounds of magnesium are mixed, for example, with any of the following alkaloids: emetin, quinin, cocain, nicotin, and strychnin.

With the form of emetin known as ipecac .3 cubic centimeter of fluid extract of ipecac may be mixed with about 3 gm. of magnesium silicate.

The proportions in which quinin may be mixed is one part of quinin to ten parts of magnesium silicate. Of the others, the proportions are: one part by weight of cocain to twenty parts of the hydrous magnesium silicate; one part of nicotin to twenty parts of magnesium silicate; one part of strychnin to forty parts of magnesium silicate. These proportions will vary with the different varieties of magnesium clay.

When mixed, as described, with quinin, since the saliva is ordinarily slightly acid, the clay will prevent the alkaloid from dissolving in the mouth, and hence the characteristic bitter taste of that drug is obviated. The presence of the clay does not change the pharmaceutical effect of the drug, hence my invention is useful in the administration of quinin. Many uses to which my invention can be put will suggest themselves to those skilled in medicine, and many other uses may be made of it, in combination with alkaloidal substances used not in medicines, but in foods, or in other products used by man. For instance, by mixing it with coffee, a decoction can be made which has the taste and odor of coffee, but is devoid of caffein. The invention can be used likewise for mixture with tobacco to provide tobacco practically devoid of nicotin, by moistening the tobacco and packing it with the reagent, which will abstract the nicotin to a large extent.

What I claim is:

1. A compound consisting of an alkaloidal substance and a magnesium clay.

2. A compound consisting of an alkaloidal substance and hydrous magnesium silicate.

3. A compound consisting of an alkaloidal substance and an insoluble compound containing magnesium.

4. A compound of an alkaloid with hydrous magnesium silicate.

In testimony whereof, I have hereunto subscribed my name this 29th day of June, 1915.

JOHN URI LLOYD.

Witnesses:
WALTER F. MURRAY,
W. THORNTON BOGERT.